(12) United States Patent
Zarn et al.

(10) Patent No.: US 9,884,667 B1
(45) Date of Patent: Feb. 6, 2018

(54) ADVANCED WATER CONTROL STORAGE FRAME SYSTEM FOR MARINE VESSELS

(71) Applicant: Brunswick Corporation, Lake Forest, IL (US)

(72) Inventors: Paul D. Zarn, Henning, MN (US); Kenneth D. Skillings, Wadena, MN (US); Terrance Weller, New York Mills, MN (US); Rory C. D. Wiebe, Steinbach MB (CA); Kyle D. Kaldor, Perham, MN (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/235,823

(22) Filed: Aug. 12, 2016

(51) Int. Cl.
| | |
|---|---|
| B63B 19/26 | (2006.01) |
| B63B 3/48 | (2006.01) |
| B63B 35/14 | (2006.01) |
| B63B 13/00 | (2006.01) |
| A01K 97/10 | (2006.01) |
| B63B 35/73 | (2006.01) |

(52) U.S. Cl.
CPC ............... *B63B 3/48* (2013.01); *A01K 97/10* (2013.01); *B63B 13/00* (2013.01); *B63B 35/14* (2013.01); *B63B 19/26* (2013.01); *B63B 2035/738* (2013.01)

(58) Field of Classification Search
CPC .. B63B 3/54; B63B 3/48; B63B 19/12; B63B 19/26; B63B 25/002
See application file for complete search history.

(56) References Cited

U.S. PATENT DOCUMENTS

| | | | | |
|---|---|---|---|---|
| 2,435,190 A | * | 2/1948 | Deegan | B63B 19/22 |
| | | | | 105/315 |
| 5,067,277 A | * | 11/1991 | Magalotti | F16F 9/0263 |
| | | | | 188/300 |
| 5,127,355 A | | 7/1992 | Magers et al. | |
| 7,165,703 B1 | * | 1/2007 | Howe | B63B 25/002 |
| | | | | 211/194 |
| 7,341,231 B2 | * | 3/2008 | Zarn | B63B 25/002 |
| | | | | 211/94.01 |
| 7,484,471 B2 | * | 2/2009 | Kalil | B63B 25/002 |
| | | | | 114/343 |
| 7,536,969 B2 | * | 5/2009 | Kyle | B63B 19/21 |
| | | | | 114/201 R |
| 8,070,378 B2 | * | 12/2011 | Gargaro, III | A01K 97/10 |
| | | | | 211/94.01 |

(Continued)

*Primary Examiner* — Andrew Polay
(74) *Attorney, Agent, or Firm* — Andrus Intellectual Property Law, LLP (57) ABSTRACT

A water control storage frame system for at least one storage compartment is formed in a boat having a deck. The system includes a frame structure rising above the deck of the boat and defining an upper peripheral opening of the at least one storage compartment. The frame structure is provided with an external structure facing away from the at least one storage compartment and configured for preventing water collecting on the deck from entering the at least one storage compartment and directing water from the deck into a drainage area. An internal structure is integrally formed with the external structure, and is configured as a peripheral track structure for receiving and retaining storage items at various locations along the peripheral track structure within the at least one storage compartment.

18 Claims, 6 Drawing Sheets

(56) References Cited

U.S. PATENT DOCUMENTS

| | | | |
|---|---|---|---|
| 9,657,890 B2* | 5/2017 | Botello | F16M 13/02 |
| 2014/0360421 A1* | 12/2014 | Hopper | B63J 2/08 |
| | | | 114/343 |

* cited by examiner

ADVANCED WATER CONTROL STORAGE FRAME SYSTEM FOR MARINE VESSELS

FIELD

The present disclosure relates to marine vessels and watercraft, and more particularly, pertains to an advanced water control storage frame system for improving dryness, retention and organization of items provided in storage compartments formed beneath the deck of a boat.

BACKGROUND

Various types of watercraft, such as fishing boats and other recreational boats, have storage compartments for storing life preservers, fishing gear, recreational equipment and other accessories. Such storage compartments are provided below bow and stern portions of the boat deck, and are typically accessible from above the boat deck by raising doors or covers movably connected to the storage compartments.

In use, the deck of a boat is subject to collecting water and moisture, such as from fishing in the rain, fog, high humidity or from surrounding water splashing upon the deck during normal boat operation. The present inventors have found that it is important to keep the storage compartments dry to avoid conditions which could promote mold growth or a musty smell, or otherwise damage items stowed in the storage compartments. In addition, the present inventors have found that it is desirable to configure the interior of the storage compartments with a construction which will enable storage items to be easily added or removed, allowing the user to customize and better organize the storage compartments.

SUMMARY

This Summary is provided to introduce a selection of concepts that are further described herein below in the Detailed Description. This Summary is not intended to identify key features or essential features of the claimed subject matter, nor is it intended to be used as an aid in limiting the scope of the claimed subject matter.

According to certain examples, a water control storage frame system for a storage compartment arrangement is provided with at least one storage compartment formed in a boat having a deck subject to collection of water thereon. The system includes a frame structure rising above the deck of the boat and defining an upper peripheral opening of the at least one storage compartment. The frame structure is provided with an external structure facing away from the at least one storage compartment and is configured for preventing water from entering the at least one storage compartment and directing water from the deck to a drainage area. An internal structure is integrally formed with the external structure and is configured as peripheral track structure for receiving and retaining storage items at various locations along the peripheral track structure within the at least one storage compartment.

According to some examples, a boat includes a hull and a deck subject to a collection of water thereon. A series of storage containers is formed between the hull and the deck. A frame structure rises above the deck of the boat and defines an upper peripheral opening for each of the storage compartments. Each frame structure is provided with a vertical external wall joined to an upper flange portion and a lower flange portion to define a peripheral track structure. The vertical external wall is configured for preventing water from entering each of the storage compartments, and directing water from the deck into a drainage area. The peripheral track structure is configured for receiving and retaining storage items at various locations on each of the storage compartments. An access door is movably mounted on the deck adjacent the frame structure for each of the storage compartments, and is configured for selective movement between an open position allowing access to the storage compartment and a closed position preventing access to the storage compartment. Each access door has an upper surface provided with a seal, and peripheral edges extending downwardly from the upper surface. Each access door is configured to prevent water from entering the storage compartment and directing water from the deck into the storage area when the access door is in the closed position.

According to further examples, a rod locker is provided for a boat having a hull, a deck subject to collection of water thereon, and a cockpit provided with an operator console and at least one seat. The rod locker includes a storage compartment provided between the hull and the deck, and is located centrally and in front of the cockpit to enable easy access to an occupant of the at least one seat. The storage compartment is formed by a wall structure provided with a rod holding arrangement adapted to receive and retain a plurality of fishing rods. The storage compartment has an upper peripheral opening defined by a frame structure rising above the deck of the boat. The frame structure is provided with an external structure configured for preventing water from entering the storage compartment and directing water from the deck into the cockpit for drainage therefrom. An internal structure is integrally formed with the external structure, and is configured as peripheral track structure for receiving and retaining storage items at various locations along the peripheral track structure within the storage compartment.

BRIEF DESCRIPTION OF THE DRAWINGS

The present disclosure references the following Figures. The same numbers are used throughout the Figures to reference like features and like components.

DETAILED DESCRIPTION

Figure 1:
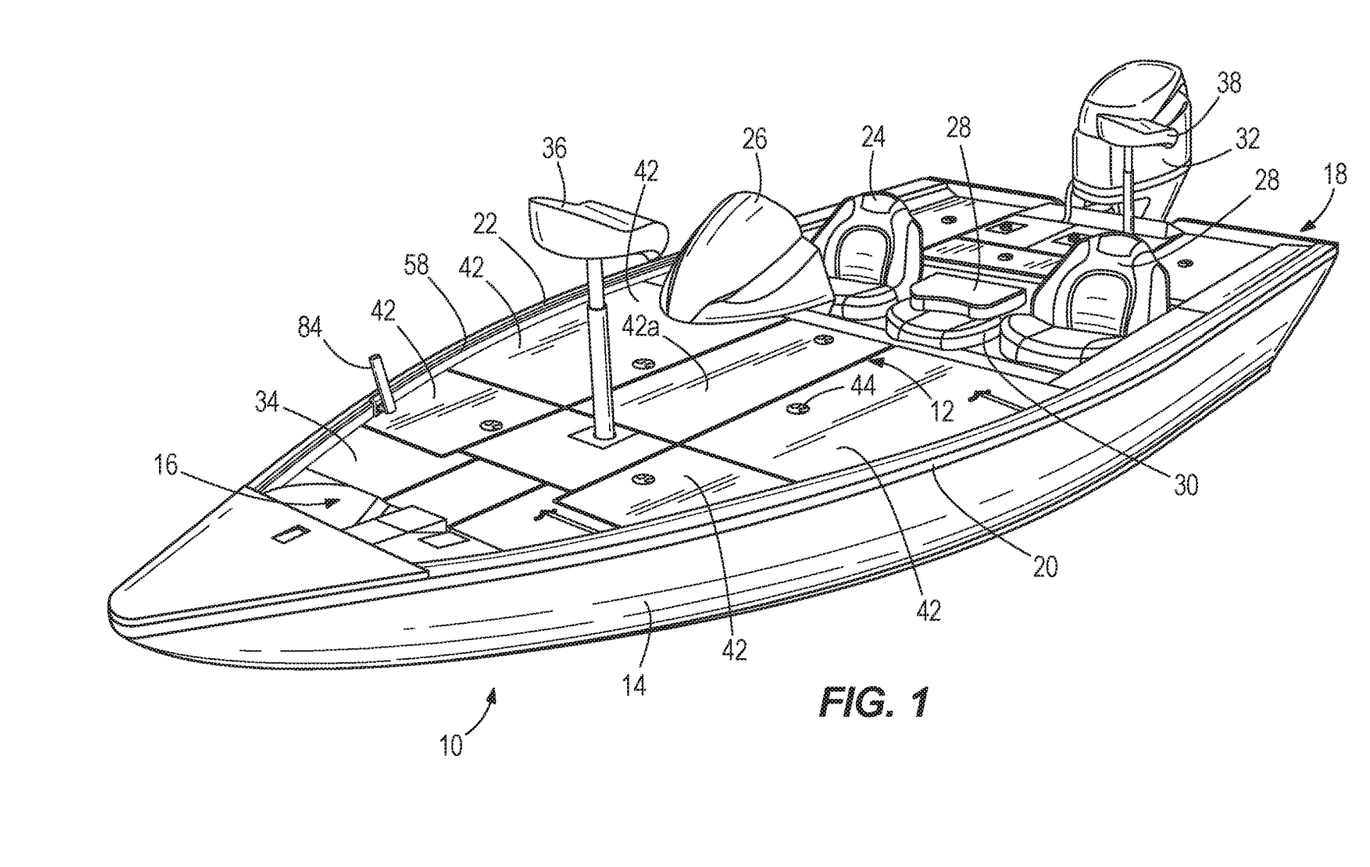
FIG. 1 is a perspective view of a boat incorporating an advanced water control storage frame system in accordance with the present disclosure.

FIG. 1 illustrates a watercraft, such as a fishing boat 10, equipped with an advanced water control storage frame system generally indicated by the reference numeral 12 in accordance with an exemplary embodiment of the present disclosure.

The fishing boat 10 has a hull 14 with a bow 16 and a stern 18, and respective port and starboard gunwales 20, 22. An operator seat 24 is provided with an operator console 26 and is mounted along with one or more passenger seats 28 in a cockpit 30 between the bow 16 and the stern 18. The fishing boat 10 also includes an outboard motor 32 situated at the center of the stern 18. The bow 16 and the stern 18 each have a deck 34 which typically provides a raised platform to facilitate casting, such as from elevated seats 36, 38, which are mounted on pedestals rising from the bow 16 and the stern 18.

Figure 6:
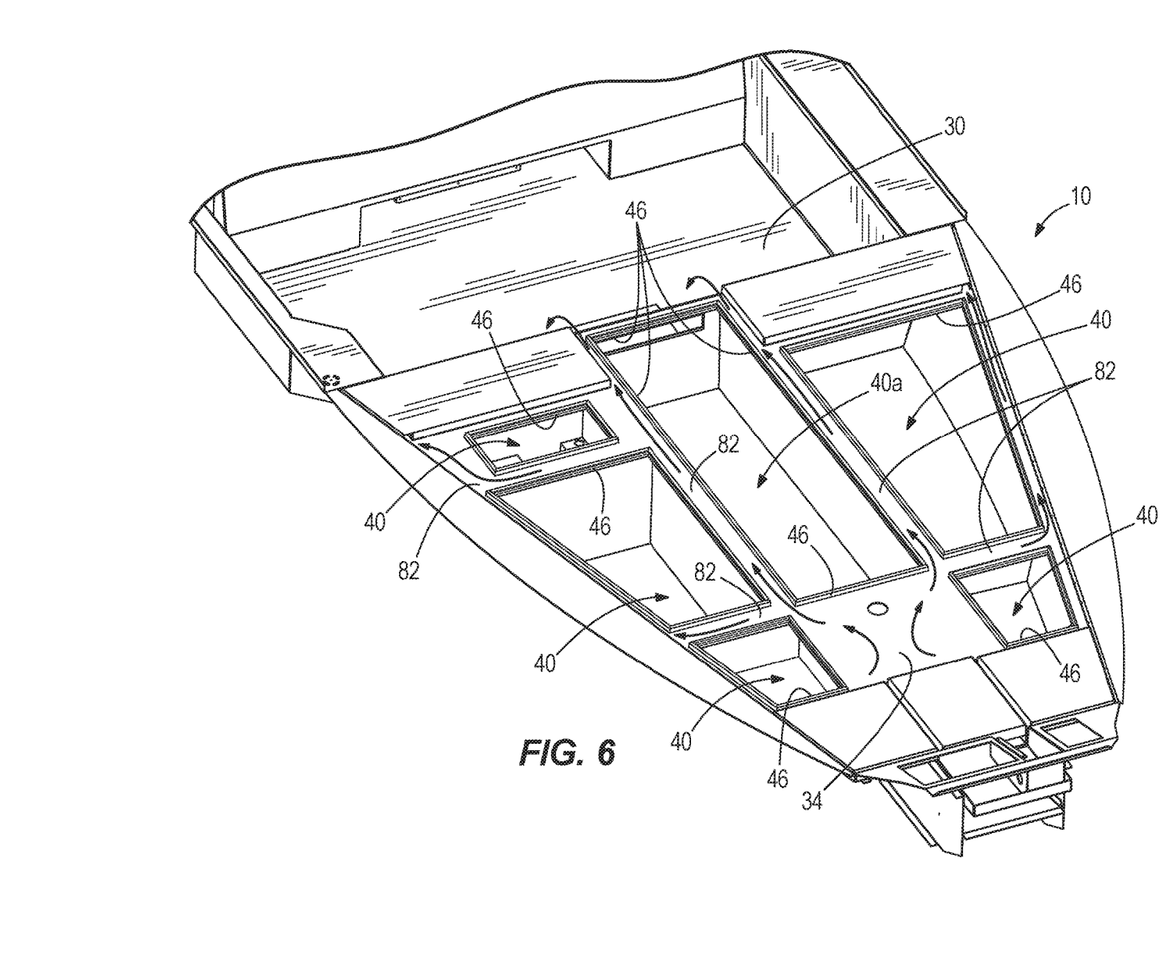
FIG. 6 is a fragmentary top perspective view of the water control storage frame system illustrating an exemplary flow of water around the storage compartments and into the cockpit, the access covers being omitted for clarity and being understood to be moved to an open position allowing access to the storage compartment.

As seen in FIG. 6, one or more open top storage compartments 40, 40a formed by a surrounding wall structure are provided between the hull 14 and the deck 34 of the fishing boat 10 and form a storage compartment arrangement. The storage compartments 40, 40a are variously shaped and sized so that different items, such as life jackets, mooring lines, anchors, coolers, batteries, fishing equipment and other gear may be stored. For example, storage compartment 40a is formed with a length which will accommodate a plurality of elongated items such as fishing rods. In the example shown, storage compartment 40a serves as a rod locker centrally located directly in front of the cockpit 30 allow easy access to a fisherman occupying one of the operator and passenger seats 24, 28.

Figure 2:
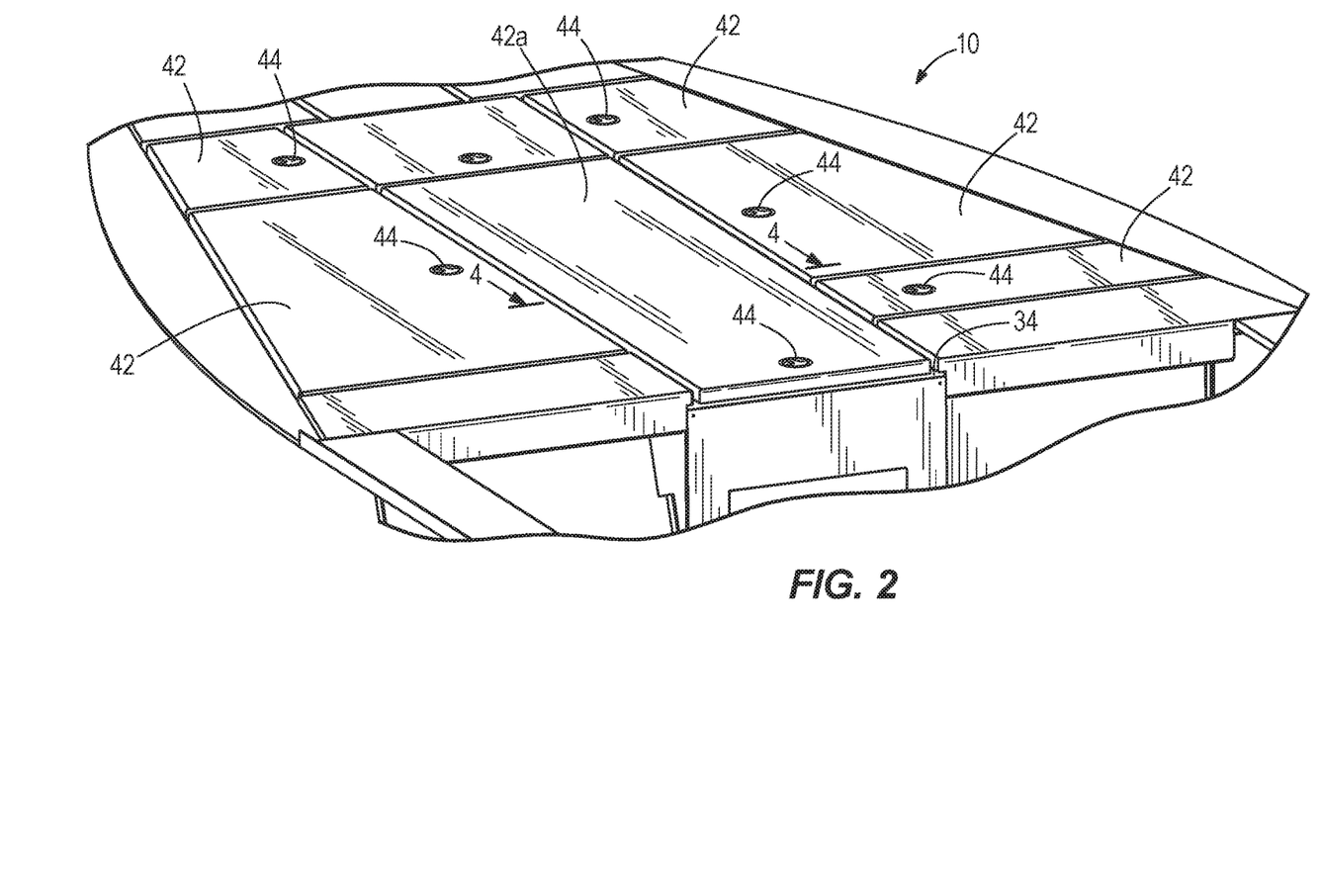
FIG. 2 is an enlarged fragmentary perspective view of the bow of the boat of FIG. 1 showing access doors of various storage compartments provided with the water control storage frame system.

Referring to FIG. 2, each of the storage compartments 40 shown in FIG. 6 is normally provided with an access door 42 movably connected to the deck 34, such as by hinges, such that the access doors 42 can be opened and closed as desired to allow and prevent access to the interior of the storage compartments 40. Each of the access doors 42 is equipped with a latching device 44 for selectively locking and unlocking each access door 42. Similarly, as seen in FIGS. 2 and 3, an access door 42a equipped with a latching device 44 is provided for selectively opening and closing storage compartment 40a as will be further described below.

Figure 5:
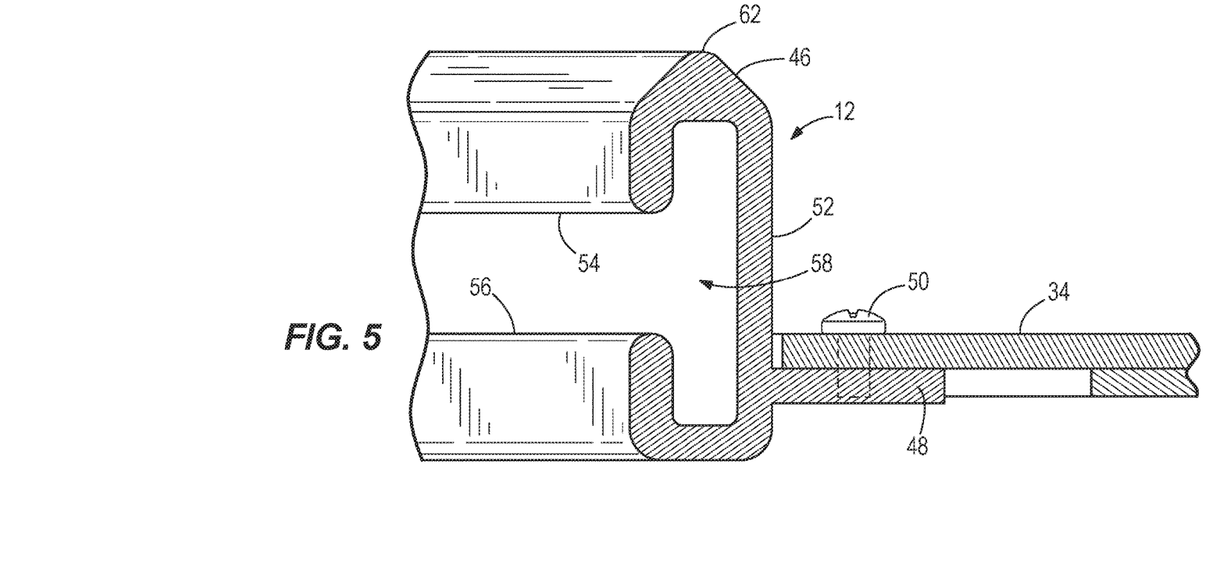
FIG. 5 is an enlarged sectional view of the water control storage frame system taken on line 5-5 of FIG. 3.

Referring to FIGS. 1 and 6, the water control storage frame system 12 includes a frame structure in the exemplary form of a rigid continuous frame extrusion 46 which extends around and defines an upper peripheral opening of each storage compartment 40, 40a. Each frame extrusion 46 shown in FIG. 6 corresponds to the peripheral configuration of the storage compartments 40, 40a and is a variously shaped four sided frame member. The frame structure may take other shapes and forms such as a number of frame extrusions 46 which are suitably interconnected together. As shown in FIG. 5, the frame extrusion 46 for each of the storage compartments 40, 40a extends upwardly from and has a peripheral extension 48 which is fixed to and beneath the deck 34, such as by screws 50. Each frame extrusion 46 is constructed with a C-shaped cross section and is integrally formed with a vertical external wall 52 located outside and facing away from the storage compartment 40, 40a, and respective upper and lower flange portions 54, 56 which together with the vertical external wall 52 define an elongated peripheral track structure 58. As will be better understood hereafter, the frame extrusion 46 provides the external vertical wall 52 for preventing any water accumulating on the deck 34 from entering the storage compartment 40, 40a, and simultaneously provides the track structure 58 for receiving a variety of items in hanging fashion inside an upper end of the storage compartment 40, 40a in a desired location along the track structure 58.

Figure 3:
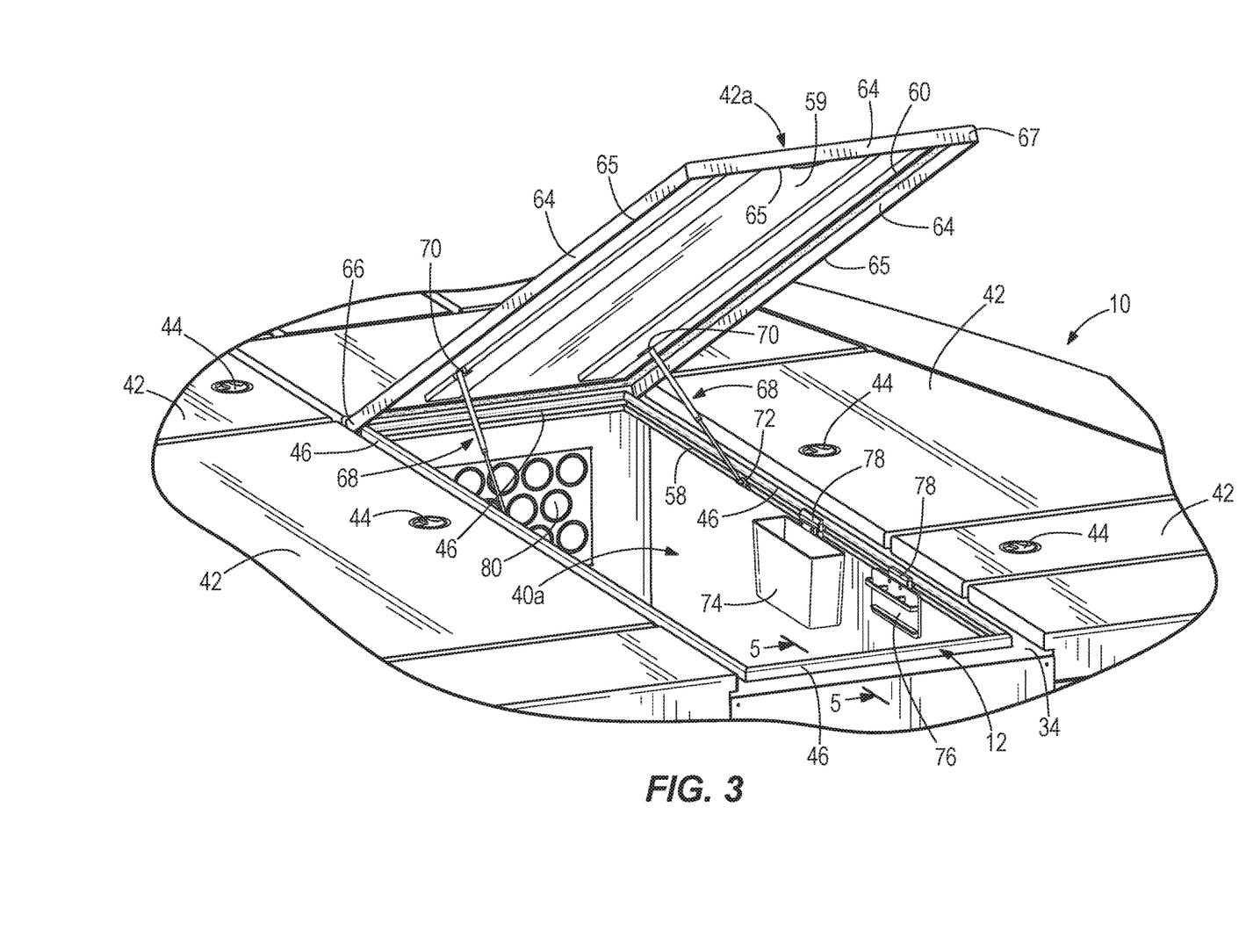
FIG. 3 is a view similar to FIG. 2 showing an access door used on a central storage compartment provided with the water control storage frame system.
Figure 4:
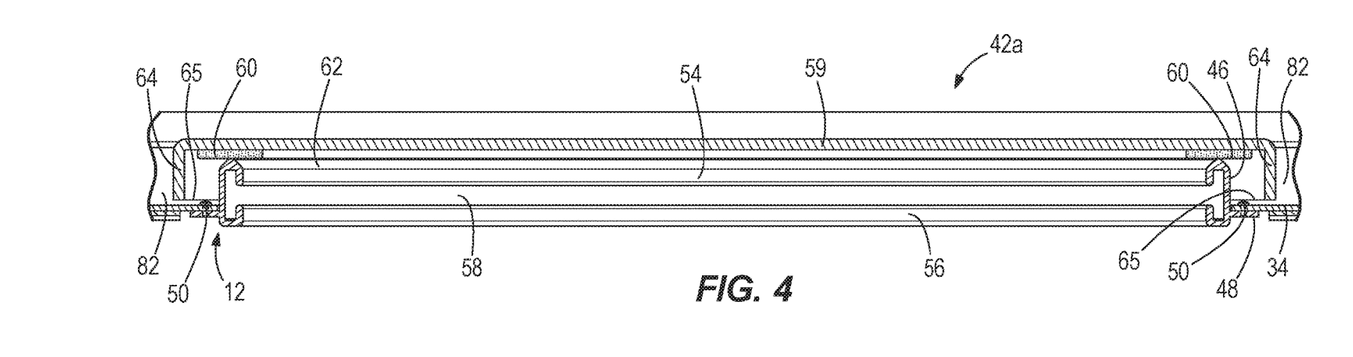
FIG. 4 is a sectional view of the water control storage frame system taken on line 4-4 of FIG. 2.

Referring to FIGS. 3 and 4, each of the access doors 42, 42a includes a peripheral seal structure for further preventing water from entering the storage compartment 40, 40a. As exemplified in the access door 42a, the underside of an upper surface 59 of access door 42a is provided about its periphery with a seal 60 designed to sealingly engage a top surface 62 of each frame extrusion 46 when the access door 42a is in a closed position (FIG. 4) with downwardly extending edges 64 of the access door 42a being in spaced relationship outside and around the frame extrusion 46, and a bottom edge 65 of the access door 42a contacting the screws 50.

As further shown in FIG. 3, the access door 42a is pivotally mounted at a forward end 66 spaced from the cockpit 30, such as by hinges or other pivot connections, to the deck 34. The access door 42a has a rearward end 67 located adjacent the cockpit 30, and configured to be lifted to the open position and lowered to the closed position. In order to assist with the pivotal movement of the access door 42a between the open position shown in FIG. 3 and the closed position shown in FIGS. 2 and 4, a motion assistance arrangement in the preferred form of a pair of extendable and retractable gas struts or cylinders 68 is provided. Each gas strut 68 has a casing end 70 pivotally attached to a support member beneath the upper surface 59 of the access door 42a, and a rod end 72 pivotally mounted in the track structure 58 on opposite sides of the storage compartment 40a. One or more gas struts or cylinders 68 may also be used to assist in movement of the access door 42 in the other storage compartments 40.

With the access door 42a in the open position of FIG. 3, it should be appreciated that various hanging items, such as a receptacle 74 and a tool belt 76 have retainers 78 which are slidably received and frictionally retained within the track structure 58 at the top of the storage compartment 40a. The provision of the track structure 58 thus enables a user to customize and organize hanging items in the storage compartment 40a as well as in the remaining storage compartments 40. Each storage compartment 40, 40a may be constructed to receive other items such as sliding drawers (tackle boxes), dividers, and netting for providing further storage customization. In the storage compartment 40a serving as a rod locker as shown in FIG. 3, a forward wall is constructed with a series of tubular receivers 80 for holding three tiers of fishing rods. Each of the storage compartments 40 can be customized using the track structure 58 and modifying the wall structure of the storage compartment as desired to provide ease of access to the storage items and supply more efficiently used storage space.

Figure 7:
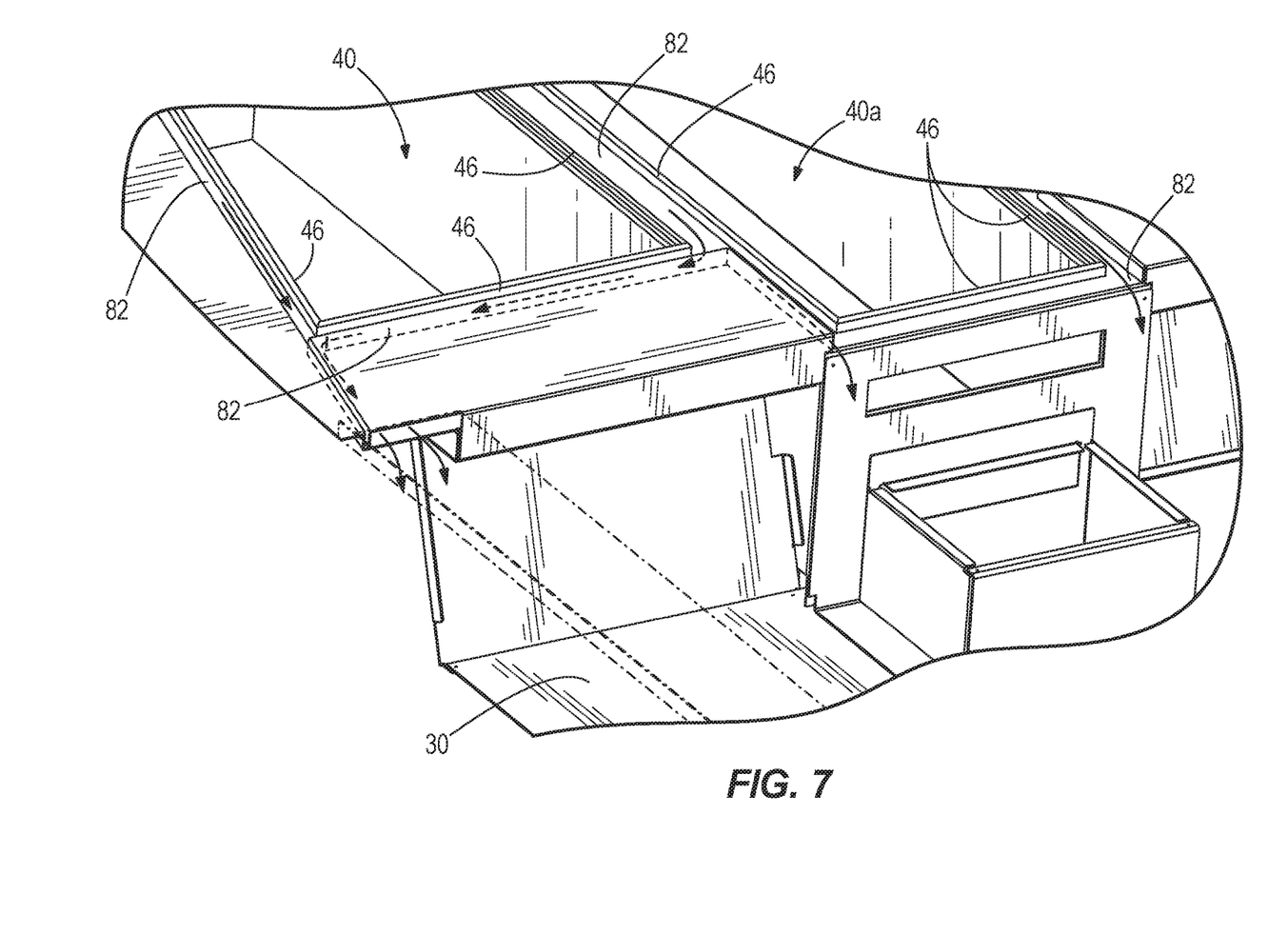
FIG. 7 is a further fragmentary perspective view of the flow of water around two of the storage compartments shown in FIG. 6 and into the cockpit provided by the water control storage frame system.

As mentioned previously, besides defining a track structure 58 for improving storage inside each storage compartment 40, 40a, the frame extrusion 46 provides the vertical external wall 52 around the top of each storage compartment 40, 40a for preventing water accumulating on the deck 34 from entering the storage compartments 40, 40a. More specifically, as depicted in FIGS. 6 and 7, with the access doors 42, 42a raised to their open position (although the access doors are shown removed for clarity), water collected on the bow 16 of the deck 34 flows in the direction of the arrows over passageways 82 formed on the deck 34 and along the vertical external walls 52 of the frame extrusions 46 at the top of the storage compartments 40, 40a. Water flowing along the passageways 82 is directed rearwardly, such as by a motion of the boat, into the cockpit 30 which is typically provided with a drain and thereby acts as a drainage area leading into a bilge having a pump for removing the water from the fishing boat 10.

With the access doors 42, 42a in their closed position as depicted in FIG. 4, each seal 60 on the underside of the upper surface 59 engages with the top surface 62 of each frame extrusion 46, and the downwardly extending edges 64 of the access doors 42, 42a assist in directing water in the passageways 82 along the deck 34 into the cockpit 30 for subsequent drainage. Accordingly, the water control storage frame system 12 functions to keep the storage compartments 40, 40a dry when the access doors 42, 42a are in the open and closed positions.

While the examples shown illustrate the water control storage frame system 12 used on storage compartments 40, 40 a provided in the bow 16, the present disclosure also contemplates the provision of the water control storage frame system 12 on storage compartments formed elsewhere in other regions of the boat, such as in the stern 18.

As a further feature of the present disclosure, the track structure 58 can be incorporated into the gunwales 20, 22 to enable storage of various items on opposite sides of the fishing boat 10. FIG. 1, for example, illustrates a tubular fishing rod holder 84 which is adjustably mounted in the track structure 58 on the starboard gunwale 22.

The present disclosure thus advantageously provides an advanced water control storage frame system 12 which creates mass dry storage and enables a customizable, more organized storage of hanging items within storage compartments formed on a boat.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may used alone or in combination with other systems and devices. Various equivalents, alternatives and modifications are possible within the scope of the appended claims.

What is claimed is:

1. A water control storage frame system for at least one storage compartment formed in a boat having a deck, the system comprising:
   a frame structure rising above the deck of the boat and defining an upper peripheral opening of the at least one storage compartment,
   the frame structure being provided with an external structure facing away from the at least one storage compartment and configured for preventing water from collecting on the deck entering the at least one storage compartment and directing water from the deck into a drainage area, and an internal structure integrally formed with the external structure and facing towards the at least one storage compartment, the internal structure comprising a peripheral track structure for receiving and retaining storage items at various locations along the peripheral track structure within the at least one storage compartment, the peripheral track structure having upper and lower flanges that together with the external structure form a C-shaped cross-section that faces the upper peripheral opening.

2. The system of claim 1, wherein the frame extrusion has a vertical external wall joined to an upper flange portion and a lower flange portion to form the peripheral track structure.

3. The system of claim 2, wherein the frame extrusion has a peripheral extension integrally formed on the vertical external wall.

4. The system of claim 3, wherein the peripheral extension is secured beneath the deck of the boat.

5. The system of claim 1, wherein an access door is movably mounted on the deck, and is configured for selective movement between an open position allowing access to the at least one storage compartment, and a closed position preventing access to the at least one storage compartment.

6. The system of claim 5, wherein the access door has an upper surface provided with a peripheral seal configured to sealingly engage a top surface of the frame structure when the access door is in the closed position to prevent water from entering the at least one storage compartment.

7. The system of claim 6, wherein the access door includes peripheral edges extending downwardly from the upper surface and configured to be in spaced relationship from the frame structure when the access door is in the closed position.

8. The system of claim 7, wherein the peripheral edges of the access door, when in the closed position, are configured to direct water from the deck into the drainage area.

9. The system of claim 5, wherein a motion assistance arrangement is provided between the frame structure and the access door for assisting in movement of the access door between the open position and the closed position.

10. The system of claim 1, wherein one wall of the at least one storage compartment is provided with a series of rod holders.

11. The system of claim 1, wherein the at least one storage compartment is comprised of a series of storage compartments formed in the boat, each of the storage compartments having the frame structure defining the upper peripheral opening.

12. The system of claim 1, wherein the internal structure is configured to hang the storage items from the peripheral track structure within the at least one storage compartment.

13. A boat comprising;
   a hull;
   a deck subject to a collection of water thereon;
   a series of storage compartments formed between the hull and the deck;
   a frame structure rising above the deck of the boat and defining an upper peripheral opening for each of the storage compartments,
   each frame structure being provided with a vertical external wall joined to an upper flange portion and a lower flange portion that are inwardly oriented towards each other so as to define a peripheral track structure, the vertical external wall being configured for preventing water from entering each of the storage compartments, and directing water from the deck into a drainage area, and the peripheral track structure being oriented towards the upper peripheral opening and configured for receiving and retaining storage items between the upper and lower flange portions at various locations along the peripheral track structure within each of the storage compartments, and
   an access door movably mounted on the deck adjacent the frame structure for each of the storage compartments and configured for selective movement between an open position allowing access to the storage compartment, and a closed position preventing access to the storage compartment
   wherein each access door has an upper surface provided with a seal, and peripheral edges extending downwardly from the upper surface, each access door being configured to prevent water from entering the storage compartment and directing water from the deck into the drainage area when the access door is in the closed position.

14. A rod locker for a boat having a hull, a deck subject to collection of water thereon and a cockpit provided with an operator console and at least one seat, the rod locker comprising;

a storage compartment provided between the hull and the deck, and located centrally and in front of the cockpit to enable access to an occupant of the at least one seat, the storage compartment being formed by a wall structure provided with a rod holding arrangement adapted to receive and retain a plurality of fishing rods, the storage compartment having an upper peripheral opening defined by a frame structure rising above the deck of the boat, the frame structure being provided with an external structure facing away from the storage compartment and configured for preventing water from entering the storage compartment and directing water from the deck into the cockpit for drainage therefrom, and an internal structure integrally formed with the external structure and facing towards the at least one storage compartment, the internal structure comprising a peripheral track structure for receiving and retaining storage items at various locations within the storage compartment, the peripheral track structure having upper and lower flanges that together with the external structure form a C-shaped cross-section that faces the upper peripheral opening.

15. The rod locker of claim 14, wherein an access door is movably mounted on the deck, and configured for selective movement between an open position allowing access to the storage compartment, and a closed position preventing access to the storage compartment.

16. The rod locker of claim 15, wherein the access door has a forward end spaced from the cockpit and is joined to the deck by a pivot arrangement, and a rearward end located adjacent the cockpit and configured to be lifted to the open position and lowered to the closed position.

17. The rod locker of claim 15, wherein the access door is provided with a motion assistance arrangement positioned between an underside of the access door and the frame structure for assisting in movement of the access door between the open position and the closed position.

18. The rod locker of claim 15, wherein the access door has an upper surface provided with a peripheral seal and peripheral edges extending downwardly from the upper surface, the access door being configured such that the peripheral seal sealingly engages the frame structure, and the peripheral edges prevent water from entering the storage compartment when the access door is in the closed position.

* * * * *